US012630471B1

(12) United States Patent
Quijada et al.

(10) Patent No.: US 12,630,471 B1
(45) Date of Patent: May 19, 2026

(54) REACTIVE PHYSICAL VAPOR DEPOSITION OF Al MIRRORS PROTECTED WITH LiF OVERCOAT, DEVICES AND PROCESSES

(71) Applicant: United States of America as represented by the Administrator of NASA, Washington, DC (US)

(72) Inventors: Manuel Quijada, Laurel, MD (US); Javier Del Hoyo, Pasadena, MD (US); Luis V. Rodriguez de Marcos, Washington, DC (US); Edward J. Wollack, Clarksville, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 415 days.

(21) Appl. No.: 18/093,549

(22) Filed: Jan. 5, 2023

(51) Int. Cl.
*C03C 17/36* (2006.01)
*G02B 1/14* (2015.01)
*G02B 5/08* (2006.01)

(52) U.S. Cl.
CPC ...... *C03C 17/3621* (2013.01); *C03C 17/3605* (2013.01); *C03C 17/3649* (2013.01); *G02B 1/14* (2015.01); *G02B 5/0875* (2013.01); *G02B 5/0891* (2013.01); *C03C 2217/252* (2013.01); *C03C 2217/285* (2013.01); *C03C 2218/151* (2013.01)

(58) Field of Classification Search
CPC .. G02B 5/0858; G02B 5/0891; C03C 17/3649
See application file for complete search history.

(56) References Cited

U.S. PATENT DOCUMENTS

2023/0168417 A1 *   6/2023   Allen .................. C03C 17/3621
                                                        359/587
2023/0417954 A1 *  12/2023   Allen ..................... C23C 28/32

* cited by examiner

*Primary Examiner* — Alex A Rolland
(74) *Attorney, Agent, or Firm* — Heather Goo; Matthew F. Johnston; Trenton J. Roche

(57) ABSTRACT

The present disclosure relates to a process to protect deposited aluminum coatings with an overcoat of LiF dielectric layer produced with a reactive Physical Vapor Deposition (rPVD) process. This process includes exposing the freshly deposited Al film to a fluorine containing gas (XeF$_2$) for immediate surface passivation. Next is the application of a Physical Vapor Deposited (PVD) LiF layer that is passivated with XeF$_2$. This process produces LiF-protected Al coatings that are more durable than Al$_+$LiF coatings produced by conventional PVD processes. The Al$_+$LiF coatings produced with this rPVD process are observed to be broadband, more durable, and less hygroscopic than coating produced with standard PVD process. In particular, the innovation has utility in realizing an intrinsic high reflectance of aluminum in the critical far-ultra-violet (90-130 nm) spectral range, while also preserving the intrinsic broadband nature of the aluminum reflectance in the near-infrared and up to at least 2500 nm.

15 Claims, 13 Drawing Sheets

| Sample ID | Roughness RMS (nm) | R @ 122 nm (Fresh) | Storage time → R @ 122 nm (Aged) | Storage environment |
|---|---|---|---|---|
| 09 | 1.56 | 0.926 | 1 week →0.923 | Desiccator 30-33% RH |
|  |  |  | 2 weeks→0.918 |  |
|  |  |  | 3 weeks→0.913 |  |
|  |  |  | 18 weeks→0.905 |  |
|  |  |  | 6 months → 0.908 |  |
|  |  |  | 12 weeks → 0.913 |  |
| 11 | 1.60 | 0.926 | 13 weeks + 1 week humidity test (50%) →0.914 | Humidity chamber 50% + 60% RH, 25°C |
|  |  |  | 13 weeks+ 1 week humidity test (50%) + 1 week humidity test (60%) →0.910 |  |
|  |  |  | 13 weeks+ 1 week humidity test (50%) + 2 weeks humidity test (60%) →0.898 |  |

FIG.9

| Sample ID | Roughness RMS (nm) | R @ 103 nm (Fresh) | R @ 103 nm (Aged) | R @ 122 nm (Fresh) | R @ 122 nm (Aged) | Storage environment |
|---|---|---|---|---|---|---|
| 18A (w/o Ti) | 3.06 (Accidentally sprayed with water) | 0.710 | 6 weeks→ 0.630 (Accidentally sprayed with water) | 0.846 | 6 weeks→ 0.709 (Accidentally sprayed with water) | Desiccator 30-33% RH |
| 18B (with Ti) | 1.02 | 0.713 | 6 weeks→0.723 | 0.857 | 6 weeks→0.829 | Desiccator 30-33% RH |
| | | | 3 months →0.726 | | 3 months →0.825 | |
| | | | 17 weeks + 1 week humidity test (50%) +30' RH> 100%→0.642 | | 17 weeks + 1 week humidity test (50%) +30' (RH> 100%) →0.767 | Humidity chamber 50% + >100% RH, 25°C |
| Standard Al/LiF Baseline | 2.34 | 0.649 | 10 months→0.244 | 0.741 | 10 months→0.569 | Desiccator 30-33% RH |

FIG.10

REACTIVE PHYSICAL VAPOR DEPOSITION OF Al MIRRORS PROTECTED WITH LiF OVERCOAT, DEVICES AND PROCESSES

FIELD

This disclosure relates to a device and process for fabricating broadband Al mirrors protected with LiF with high reflectivity in the 100-2500 nm range and in particular, at 122 nm wavelength.

BACKGROUND

Pure Aluminum (Al) exhibits intrinsic high reflectance long-wards of 83 nm. However, Al coatings must be protected from its naturally occurring and absorptive oxide layer when exposed to air with a thin film of a transparent material for use <160 nm. Aluminum protected with fluorides such as $AlF_3$ or $MgF_2$ has provided the most commonly encountered solution to this concern, and LiF is commonly used when performance is required below 120 nm down to 100 nm. Below 100 nm and down to 90 nm, no transparent material is available to protect the Al and the achievable mirror reflectance stays below 40%. The two unique characteristics of the problem are that even above 100 nm, the reflectance of protected Al is limited by the residual absorption and the eventual degradation of the fluoride passivation layer overcoats. The Al/LiF technology was discovered about 60 years ago, and since then there have been few but significant advances. Angel et al. (D. W. Angel, W. R. Hunter, and R. Tousey, "Extreme Ultraviolet Reflectance of LiF-Coated Aluminum Mirrors," JOSA 51 (8), 913-914 (1961)) reported the first aluminum mirrors protected with LiF in the '60s, and a few years later, Cox et al. (J.T. Cox, G. Hass, and J. E. Waylonis, "Further Studies on LiF-Overcoated Aluminum Mirrors with Highest Reflectance in the Vacuum Ultraviolet," Appl. Opt. 7, 1535-1540 (1968)) were first in optimizing Al/LiF mirrors at the Hydrogen Lyman β line (102.6 nm). Then, Hutcheson et al. (E. T. Hutcheson, G. Hass, and J. T. Cox, "Effect of Deposition Rate and Substrate Temperature on the Vacuum Ultraviolet Reflectance of $MgF_2$- and LiF-Overcoated Aluminum Mirrors," Appl. Opt. 11, 2245-2248 (1972)) studied the effect of deposition rate and substrate temperature for Al/LiF mirrors. The fact that high substrate temperatures enhanced the mirror reflectivity was further explored several decades later by Quijada et al. (M. A. Quijada, Javier del Hoyo, Stephen Rice, "Enhanced Far-Ultraviolet Reflectance of $MgF_2$ and LiF Over-coated Al Mirrors," Proc. SPIE 9144 (2014)) who demonstrated the highest reflectance at 122 nm wavelength with Al/LiF mirrors fabricated using the 3-step hot process (M. A. Quijada, S. Rice, and E. Mentzell, "Enhanced $MgF_2$ and LiF Over-coated Al Mirrors for FUV Space Astronomy," Proc. SPIE 8450 (2012)). A combination of fluorides have also been used, including LiF, to protect Al, (S. Wilbrandt, O. Stenzel, H. Nakamura, D. Wulff-Molder, A. Duparré, and N. Kaiser, "Protected and enhanced aluminum mirrors for the VUV," Appl. Opt. 53, A125-A130 (2014)), environmentally stable Al/LiF coatings with an $AlF_3$ overcoat by atomic layer deposition (ALD), (B. Fleming, M. Quijada, J. Hennessy, A. Egan, J. Del Hoyo, B. A. Hicks, J. Wiley, N. Kruczek, N. Erickson, and K. France, "Advanced environmentally resistant lithium fluoride mirror coatings for the next generation of broadband space observatories," Appl. Opt. 56, 9941-9950 (2017)) and the development of an ALD recipe for LiF and the demonstration of Al mirrors protected with atomic-layer deposited LiF (J.

Hennessy and S. Nikzad, "Atomic Layer Deposition of Lithium Fluoride Optical Coatings for the Ultraviolet," Inorganics 6 (2), 46 (2018)).

The performance of conventional $Al_xLiF$ degrades significantly when stored in humid environments as LiF is a hygroscopic material. As an example, the reflectance of freshly deposited Al/LiF coatings for the Far Ultraviolet Spectroscopic Explorer (FUSE) were about 70% in the short FUV wavelengths, but that reflectance decreased to about 55% by launch, (H. W. Moos, Stephan R. McCandliss, and Jeffrey W. Kruk, "FUSE: lessons learned for future FUV missions," Proc. SPIE 5488, 1 (2004)) despite the extensive use of nitrogen purging during processing the instrument payload. The degradation of Al/LiF mirrors exposed to air has been an issue since as early as in the '60s where the first Al/LiF mirrors were fabricated (D. W. Angel, W. R. Hunter, and R. Tousey, "Extreme Ultraviolet Reflectance of LiF-Coated Aluminum Mirrors," JOSA 51 (8), 913-914 (1961)). The latter authors were the first to correlate the LiF aging with the relative humidity in the environment. Cox et al. (J. T. Cox, G. Hass, and J. E. Waylonis, "Further Studies on LiF-Overcoated Aluminum Mirrors with Highest Reflectance in the Vacuum Ultraviolet," Appl. Opt. 7, 1535-1540 (1968)) noticed that Al/LiF mirrors in which LiF was deposited at higher temperature were more stable than those deposited at room temperature. They also studied how the extinction coefficient (k) of a thin layer of LiF increased as a function of the time exposed to air at 121.6 nm wavelength. Oliveira et al. (C. M. Oliveira, K. Retherford, S. J. Conard, R. H. Barkhouser, S. D. Friedman, "Aging studies of LiF-coated optics for use in the far ultraviolet," Proc. SPIE 3765 (1999)) performed a comprehensive humidity test on Al/LiF mirrors for FUSE, and they reported the degradation over time of mirrors exposed at environments with different relative humidity levels. The degradation of LiF can be mitigated by keeping the mirrors in a dry environment (e.g., inert purge such as N2) or stored under vacuum throughout integration and testing. However, the complexity associated with maintaining these risk mitigation measures for optical systems can be prohibitive and therefore a means of permanently protecting the LiF from moisture exposure is preferable. Recently tested strategies to mitigate LiF degradation are mostly focused on either producing a more dense and compact protective layer, as hot-deposited fluorides are denser and therefore with less room for contaminants, (L. V. Rodríguez De Marcos, J. I. Larruquert, J. A. Méndez, N. Gutiérrez-Luna, L. Espinosa-Yáñez, C. Honrado-Benítez, J. Chavero-Royan, and B. Perea-Abarca, "Optimization of $MgF_2$-deposition temperature for far UV Al mirrors," Opt. Express 26, 9363-9372 (2018)) or by overcoating the mirror with a passivation layer. Early in the 1960s, a private communication with J. D. Purcell of the U. S. Naval Research Laboratory suggested that overcoating an Al/LiF mirror with a very thin layer of either $MgF_2$ or $CaF_2$ would significantly enhance its stability. These two strategies (hot-deposition combined with a very thin fluoride overcoat) have recently been implemented and tested by Fleming et al. (B. Fleming, M. Quijada, J. Hennessy, A. Egan, J. Del Hoyo, B. A. Hicks, J. Wiley, N. Kruczek, N. Erickson, and K. France, "Advanced environmentally resistant lithium fluoride mirror coatings for the next generation of broadband space observatories," Appl. Opt. 56, 9941-9950 (2017)) and the stability of the LiF resulting passivation layer was significantly improved. Lastly, it is important to mention that although the effect of moisture in the optical properties of LiF films is well known, there is still limited knowledge about the physical mechanisms that ultimately drive the LiF degradation when exposed to moisture, with some exceptions such as the work of Lewis et al. (Devin M. Lewis, Caleb Michael Plewe, Alexandra Gallion Stapley, Joshua J. Vawdrey, R. Steven Turley, David D. Allred, "Illuminating the degradation of lithium fluoride mirror coatings in humid environments," Proc. SPIE 11451, 1145141 (2020)).

SUMMARY

In one embodiment, a method of forming a mirror device in a reaction chamber is provided. The method includes using a substrate which is positioned in the reaction chamber which is under vacuum; using Al that has been evaporated by physical vapor deposition using heated tungsten coils; exposing the substrate to the Al to form a Al layer thereon; exposing the Al layer to $XeF_2$ gas to form a layer of $AlF_3$ on the Al layer; and exposing the $AlF_3$ layer to a metal-fluoride dielectric gas evaporated using a heated molybdenum boat to form a layer of the metal-fluoride dielectric on the $AlF_3$ layer. This entire sequence needs to be done "in situ" (without breaking vacuum) to prevent the formation of aluminum native oxides.

In one embodiment, a method of forming a mirror device in a reaction chamber is provided. The method includes using a substrate which is positioned in the reaction chamber which is under vacuum; using Al that has been evaporated by physical vapor deposition using heated tungsten coils; exposing the substrate to the Al to form a Al layer thereon; exposing the Al layer to $XeF_2$ gas to form a layer of $AlF_3$ on the Al layer; exposing the $AlF_3$ layer to a metal-fluoride dielectric gas to form a layer of the metal-fluoride dielectric on the $AlF_3$ layer; and exposing the metal-fluoride dielectric layer to $XeF_2$ gas. This entire sequence needs to be done "in situ" (without breaking vacuum) to prevent the formation of aluminum native oxides.

In another embodiment, a mirror device is provided. The mirror device includes a substrate; a Al layer over the substrate; a $AlF_3$ layer over the Al layer; and a metal-fluoride dielectric layer over the $AlF_3$ layer. The method includes exposing the provided mirror to $XeF_2$ gas to fill the pores in the metal-fluoride dielectric layer with fluorine and thus passivate the said layer.

This reactive physical vapor deposition (rPVD) method of forming a mirror device offers some features that are not possible with a conventional physical vapor deposition (PVD) coating process. The advantages of the present procedure are: First, this passivation technique produces state-of-the-art and environmentally-stable protected Al mirrors, whose FUV performance has been demonstrated to surpass the best LiF-protected Al mirrors realized by PVD with a hot substrate up to date. Secondly, the entire process is carried out at ambient temperature. Third, this is a highly scalable process, limited only by the sizes of the coating chamber where the passivation (with $XeF_2$) and depositions of Al and LiF are carried out.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 9 is tabular data of embodiments of the present disclosure;

FIG. 10 is tabular data of embodiments of the present disclosure;

DETAILED DESCRIPTION

Figure 1:
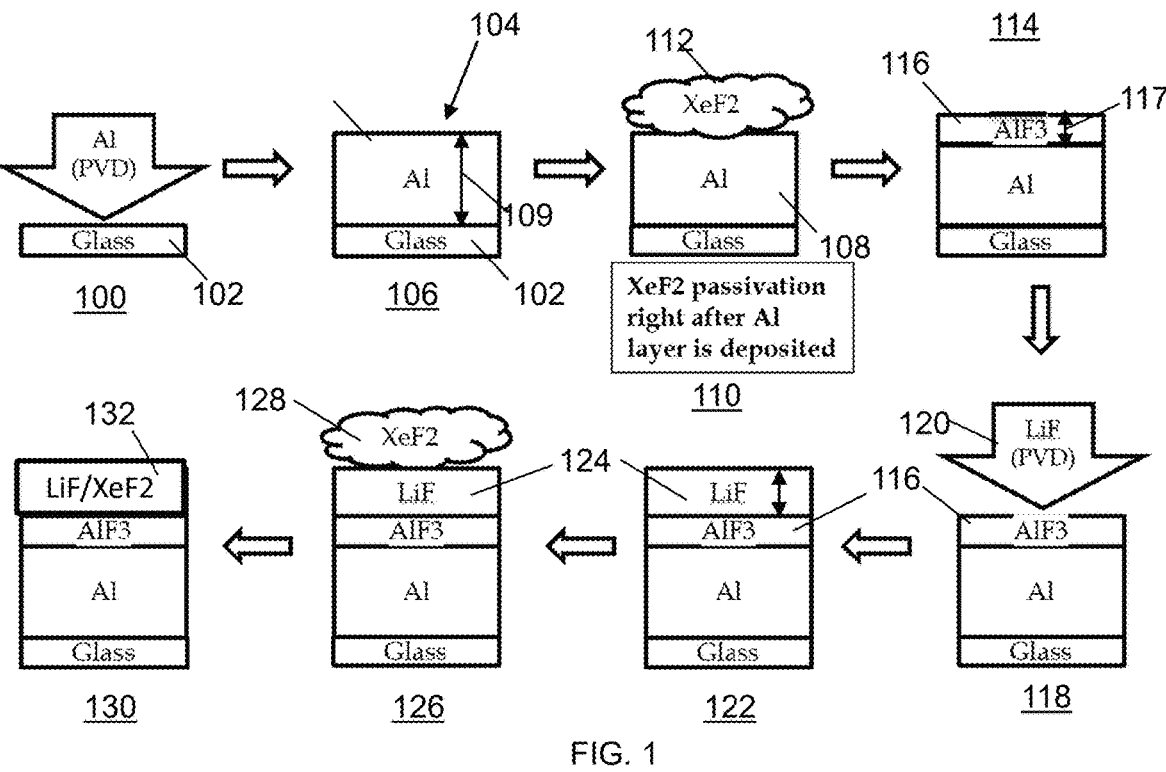
FIG. 1 is a schematic illustration of a process embodiments and structural embodiments of the present disclosure.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

The terms "%", "% by weight", "weight %" and "wt %" are all intended to mean unless otherwise stated, percent by weight based upon a total weight of 100% end composition weight. Thus 10% by weight means that the component constitutes 10 wt. parts out of every 100 wt. parts of total composition.

All of the embodiments included here are with the proviso that the sum of ingredients in the exemplary compositions does not exceed 100%.

Aspects of the present disclosure include depositing high performance UV to FIR optical broadband coatings by designing/constructing hybrid thin film deposition/fluorination chamber capable of depositing aluminum under ultra-high vacuum with the capability of adding a precursor gas to fluorinate the surface and form a thin layer of aluminum fluoride ($AlF_3$) to protect the metal from oxidation. The thin $AlF_3$ layer will then be overcoated with a metal fluoride coating deposited using physical vapor deposition to achieve a controlled film thickness to enhance the mirror performance by optical interferential means.

Further aspects of the present disclosure include a laminated device (e.g., a mirror device) including an aluminum (Al) layer deposited on a substrate that is exposed to xenon di-fluoride ($XeF_2$) gas, followed by a lithium fluoride (LiF) overcoat which, in turn is exposed again to $XeF_2$ gas as well as multi-layered embodiments formed during the process.

Furthermore, aspects of the present disclosure include Al mirrors protected with a flash LiF overcoat. Each of these Al and LiF layers are produced utilizing a room-temperature reactive Physical Vapor Deposition (rPVD) process that consists of exposing these films growth to a fluorine-containing gas (e.g., $XeF_2$). Embodiments of the present disclosure include two sets of Al/LiF mirrors produced with this rPVD process. The first embodiment is optimized at a wavelength of 121.6 nm and presents an unprecedented reflectance of 92.6% at this wavelength. The second embodiment is optimized at shorter wavelengths by reducing the thickness of the LiF overcoat to have a more balance reflectance performance in the far-ultraviolet (FUV) spectral range from 90-200 nm. Both embodiments present high reflectivity in a spectral range from 90 nm up to the upper limit of the near infrared (2500 nm). This process of the present disclosure is observed to produce more durable and less hygroscopic mirrors than those fabricated with a standard physical vapor deposition (PVD) process and has utility in realizing an intrinsic high reflectance of aluminum in the critical FUV spectral range.

Mirrors were produced and data were collected at NASA's Goddard Space Flight Center (GSFC) in the Thin Films Laboratory. The coatings were carried out in a 0.5-m diameter stainless-steel cylindrical deposition chamber. The chamber was pumped with a cryogenic system, and the fore vacuum was made with a rough pump. Base pressure of the chamber is $1.9 \times 10^{-8}$ Torr. Pure Al was evaporated from tungsten coils. The average Al deposition rates were greater than about 50 Å per second. The metal-fluoride dielectric (LiF) depositions were performed with a molybdenum bowl with a deposition rate ranging from 30 Å/s to about 96 Å/s. Film thicknesses were measured in-situ with a quartz-crystal monitor (QCM) that had been previously calibrated through stylus profilometry. The substrates were 50 mm×50 mm pieces of BK7 glass (microscopy slides), however, other common optically smooth amorphous glasses, ceramics, crystalline solids, and metals substrate materials can be utilized.

The process for preparing these $Al_xLiF$ mirror coatings utilizes exposure to $XeF_2$ gas before and after the Physical Vapor Deposition (PVD) of the LiF metal-fluoride dielectric. The technical description of the process is as follows: First, bare optically smooth glass is coated with Al in a high vacuum chamber by PVD at the NASA GSFC. This process, along with the chamber in which the process is carried out, has been extensively described elsewhere, (e.g., see Section 2.1 in L. V. Rodriguez de Marcos, D. R. Boris, E. Gray, J. G. del Hoyo, A. C. Kozen, J. G. Richardson, S. G. Rosenberg, S. G. Walton, V. Wheeler, E. J. Wollack, J. M. Woodward, and M. A. Quijada, "Room temperature plasma-etching and surface passivation of far-ultraviolet Al mirrors using electron beam generated plasmas," Opt. Mater. Express 11, 740-756 (2021)) where the only difference is that in the present process the chamber was baked out for several days at 100-105° C. before the deposition. Then, the bare Al mirror is immediately exposed to the reactive $XeF_2$ gas before and after the application of the flash evaporated LiF layer by conventional PVD. Therefore, the Al is exposed to $XeF_2$ within a few seconds after the aluminum evaporation, and typically the exposure lasts for 3 mins. The quick exposure of bare Al to $XeF_2$ produces a thin ($\approx 2.5$-3.2 nm, typical values measured through ellipsometry) protective layer of $AlF_3$. Once the mirror is complete, is exposed again to a high partial pressure of $XeF_2$ for a few seconds. An important detail is that all steps are carried out at ambient temperature and in-situ without breaking vacuum conditions.

After the mirror coating fabrication, optical characterization is performed with a McPherson Vacuum Ultraviolet (VUV) 225 spectrophotometer. This spectrometer and measurements configuration have been described elsewhere (L. V. Rodriguez de Marcos, D. R. Boris, E. Gray, J. G. del Hoyo, A. C. Kozen, J. G. Richardson, S. G. Rosenberg, S. G. Walton, V. Wheeler, E. J. Wollack, J. M. Woodward, and M. A. Quijada, "Room temperature plasma-etching and surface passivation of far-ultraviolet Al mirrors using electron beam generated plasmas," Opt. Mater. Express 11, 740-756 (2021)). The estimated absolute reflectance error is ≤1%. FUV reflectance was measured immediately after deposition, and then again after several weeks of storage in a desiccator with a relative humidity of 40%. A HORIBA Jovin-Yvon spectroscopic ellipsometer operating in the 200-2500 nm range in a fixed configuration of 70° was used to obtain information about the thickness and optical properties of the $AlF_3$ layer resulting from exposing bare Al to $XeF_2$. Atomic force microscopy (AFM) was used to study the surface roughness, and measurements were performed using a Bruker Dimension Edge AFM system in tapping mode with 256 samples/line. The topography of each sample was acquired in two fields of 500 nm×500 nm and 5 μm×5 μm size.

Embodiments of the present disclosure are included in FIG. 1. In step 100, Al is applied a substrate 102 (e.g., glass) to an exposed surface thereof using PVD to form, for example a mirror 104. At 106, mirror 104 includes substrate 102 and Al layer 108 formed in step 100. Other substrates other than glass can include fused silica, non-porous lithium aluminum silicon-oxide material (Zerodur®), titania-silicate glass (ULE®), silicon carbide, alumina (synthetic sapphire), aluminum, beryllium, and other common optical substrates. Process step can be performed in a vacuum range between about $1 \times 10^{-7}$ Torr and about $1 \times 10^{-12}$ Torr (typically ~1.9×

$10^{-8}$ Torr). The Al layer 108 can have a thickness 109 of between about 45 nm and about 150 nm. The Al can be obtained by evaporating it using, for example, tungsten coils or other refractory metal that does not react with Al. The deposition rate can be equal or greater than about 50 Å per second.

In step 110, the Al layer 108 is exposed to $XeF_2$ 112 gas, substantially pure or pure, in a dry-vacuum based reaction that requires no plasma or other activation, minimizing damage to the Al layer 108. The Al layer 108 is exposed to the $XeF_2$ 112 for about 30 seconds to about 30 minutes, within a minimum of about 3 seconds and a maximum of about 30 seconds after formation of the Al layer 108. The $XeF_2$ 112 can be sublimated and controlled at pressures between $1\times10^{-3}$ Torr and about 4 Torr and the sublimated compound then exposed to the Al layer 108. Process step 110 is performed in a vacuum at between about $1\times10^{-7}$ Torr and about 10 Torr (typically $\sim1\times10^{-4}$ Torr). The thickness rate of the passivation layer formed onto the Al layer 108 during the fluorination can be from about 0.1 Å per second to about 1 Å per second.

Figure 2:
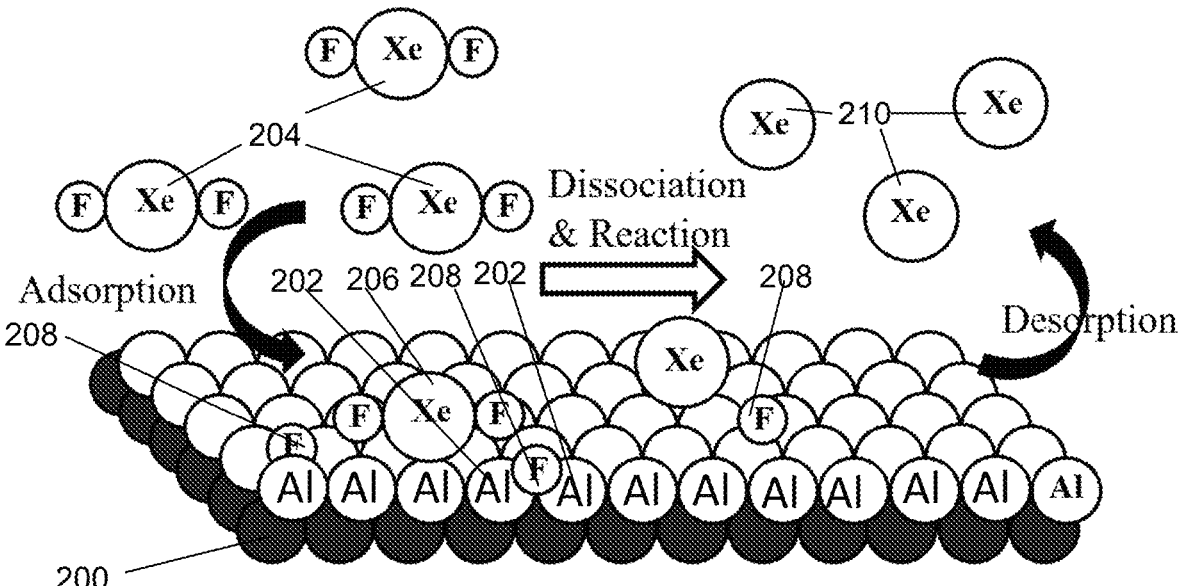
FIG. 2 is a schematic illustration of a step in a process embodiment of the present disclosure.

A schematic of step 110 is illustrated in FIG. 2. In the illustration, there is a substrate 200 and an Al layer 202. The Al layer 202 is exposed to gaseous $XeF_2$ 204, the latter being adsorbed 206 followed by dissociation and reaction 206 with the Al 202. The F 208 remains associated with the Al 202 and free Xe 210 is then desorbed.

In FIG. 1 step 114, the $AlF_3$ layer 116 is formed from step 110. The $AlF_3$ layer 116 so formed over the Al layer 108 and can have a thickness 117 of between about 2.5 nm and about 3.2 nm.

In step 118, the $AlF_3$ layer 116 is exposed to a metal-fluoride dielectric 120 gas, for example, lithium fluoride (LiF), magnesium fluoride ($MgF_2$), aluminum trifluoride ($AlF_3$), or other fluorides which can be sublimated by grinding them and using a current to melt them in vacuum and the sublimated compound then exposed to the $AlF_3$ layer 116 to deposit a metal-fluoride dielectric layer 122 over the $AlF_3$ layer 116. The purity of the metal-fluoride dielectric layer should be greater than about 99.9% to minimize strong UV absorption. The $AlF_3$ layer 116 is exposed to the metal-fluoride dielectric 118 after formation of the $AlF_3$ layer 116 until the desired layer thickness is reached. Process step 118 can be performed in a vacuum at between about $1\times10^{-12}$ Torr and about $1\times10^{-6}$ Torr. The deposition rate can be from about 30 Å per second to about 96 Å per second.

In step 122, the metal-fluoride dielectric layer 124 (e.g., LiF) is formed from step 118. The metal-fluoride dielectric layer 124 so formed can have an optical thickness close to a quarter wave delay for the FUV wavelength at which the mirror is optimized, which translates into physical thicknesses of between about 12 nm and about 30 nm.

In step 126, the metal-fluoride dielectric layer 124 is exposed to $XeF_2$ 128 similarly to step 110 for a period of from about 30 seconds to about 20 minutes. The metal-fluoride dielectric layer 124 is exposed to the $XeF_2$ 128 within a minimum of about 30 seconds and a maximum of about 20 minutes, about 3 to about 30 seconds after formation of the metal-fluoride dielectric layer 124.

The resulting multi-layered embodiment shown in 130 includes layer 132 than includes LiF and $XeF_2$, the latter filling in gaps present in the LIF structure of the layer.

Figure 3:
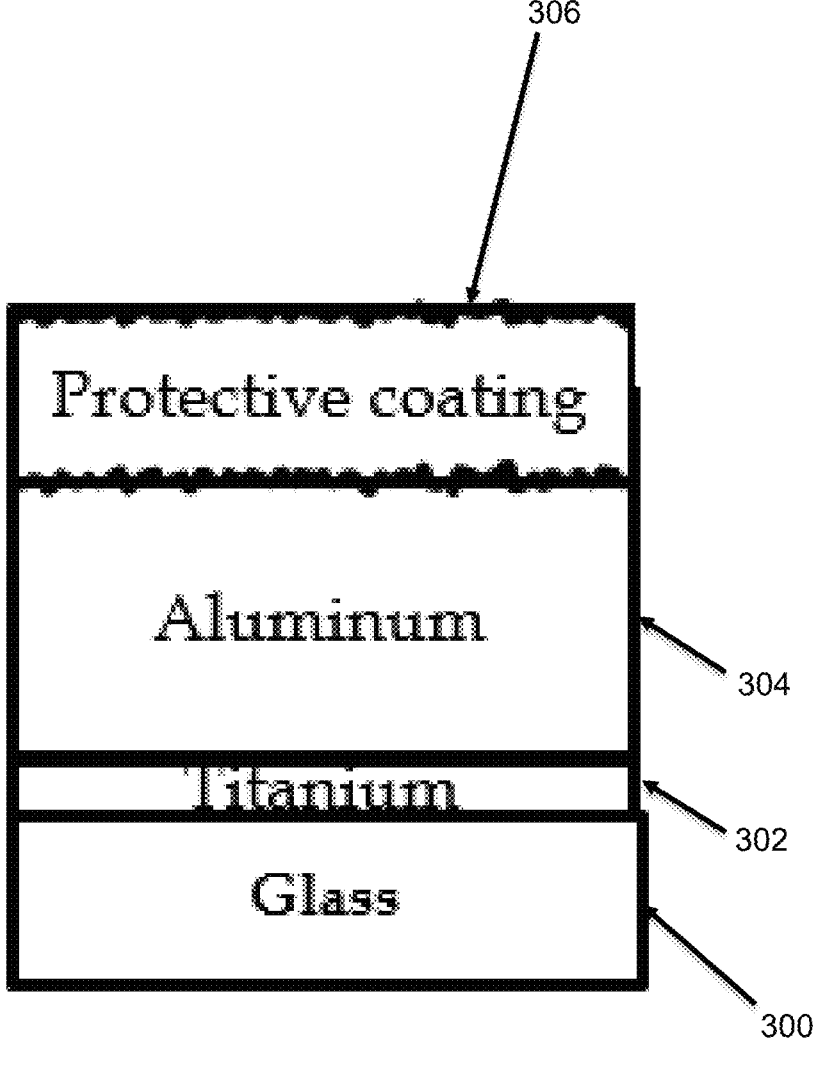
FIG. 3 is a schematic illustration of an alternative structural embodiment of the present disclosure.

Another embodiment of the present disclosure is illustrated in FIG. 3 which includes a substrate (e.g., glass) 301, a titanium (Ti) underlayer 302, an aluminum (Al) layer 304 and a protective coating 306 of $AlF_3$ and LiF layers, the latter treated with $XeF_2$. The Al layer, $AlF^3$, LiF layers and the two exposures of $XeF_2$ are accomplished as described above in FIG. 1. The Ti layer is applied to the substrate by physical vapor deposition, as described in [0004], or by sputtering, where microscopic particles from a solid target are ejected from its surface after the target is bombarded by energetic particles of a plasma, or by chemical vapor deposition techniques, including atomic layer deposition.

Figure 4:
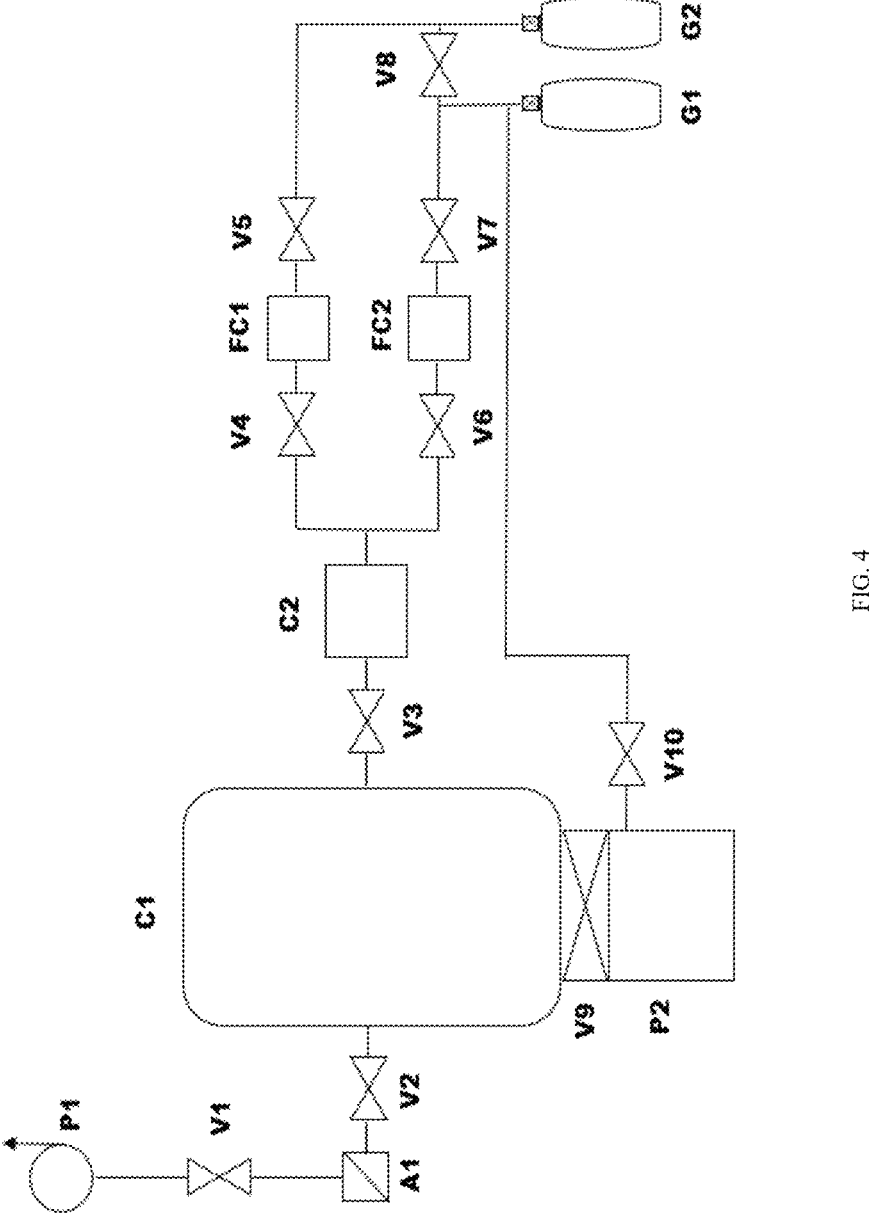
FIG. 4 is a schematic illustration of an apparatus embodiment of the present disclosure.

FIG. 4 is a schematic illustration of an embodiment including a coating chamber and related components in which method embodiments of the present disclosure are performed and object embodiments are made including use of reactive gas ($XeF_2$) delivered into coatings chamber using continuous or pulsed flow. The chamber designed is resistant to corrosive gases. The coating chamber and related components includes a gas abatement □1; a high vacuum coating chamber/reactor C1; a gas expansion chamber C2; gas flow controllers FC1 and FC2; a reactive gas source ($XeF_2$) G1; a carrier gas (N2) purge gas source G2; a rotary vane pump P1; a cryo-pump P2; a roughing valve V1; an isolation valve and V2; a passivation/chamber purge valve V3; a downstream carrier/purge gas valve V4; a upstream carrier/purge gas valve V5; a downstream reactive valve V6; an upstream reactive valve V7; a carrier gas purge valve V8; a high-vacuum valve V9; and a bypass valve V10. The high vacuum coating chamber/reactor C1 is placed under vacuum using a two stage pumping system. The rotary vane pump P1 is activated followed by the roughing valve V1 and isolation valve V2 to place chamber under a medium vacuum. The gas abatement A1 is in line to both neutralize reactive gases and serve as a trap for the rotary vane pump P1. Once the coating chamber C1 reaches a medium vacuum, the rotary vane pump P1 is isolated from the coating chamber C1 and the high vacuum valve V9 and the cryo-pump P2 are activated to place the chamber C1 under high vacuum. In turn, the passivation chamber/purge valve V3, the downstream reactive valve V6, the bypass valve V10, and the upstream reactive gas valve V7 are activated to get the gas manifold tubing under high vacuum. Once the desired pressure is met on the coating chamber C1, the coating chamber C1 is ready for the passivation process which can be applied with either continuous flow or pulsed flow. Operating the chamber C1 in continuous flow involves leaving the passivation valve V3, the downstream reactive valve V6, and the high vacuum valve V9 open while closing the supplementary valves. The reactive gas flow is then controlled using the gas controller FC2 and the high vacuum valve which can also be used as a throttling valve. The carrier gas flow is controlled using gas flow controller FC1 and activating the downstream carrier gas valve V4 and upstream carrier gas valve V5. Additionally, operating the chamber C1 under pulsed gas flow mode involves activating only the upstream reactive gas valve V7. The downstream reactive gas valve V6 is then opened while the gas flow controller FC2 limits the gas going into the gas expansion chamber C2 to a desired pressure. Once the desired pressure is met, subsequent downstream reactive valve V6 closes and the passivation valve V3 is opened. The process is repeated until the desired amount of pulses are attained. The same procedure is also used when using a carrier gas as the upstream carrier gas valve V5 and the downstream carrier gas valve V4 are opened until the gas expansion chamber reaches a desired pressure percentage relative to the reactive gas; once this pressure setpoint condition is met for both the reactive gas and carrier gas in the expansion chamber C2, the passivation valve V3 is opened into the coating chamber C1. The process is repeated until the desired amount of pulses is attained. The process is finished when either a dwell time gas condition or pulsed gas condition is met. At the end of the process, all the reactive gas manifold lines are pumped by the cryopump P2 by opening the bypass valve V10. The carrier gas purge valve V8 is then opened to purge the gas lines and drive out the reactive gases.

Figure 5:
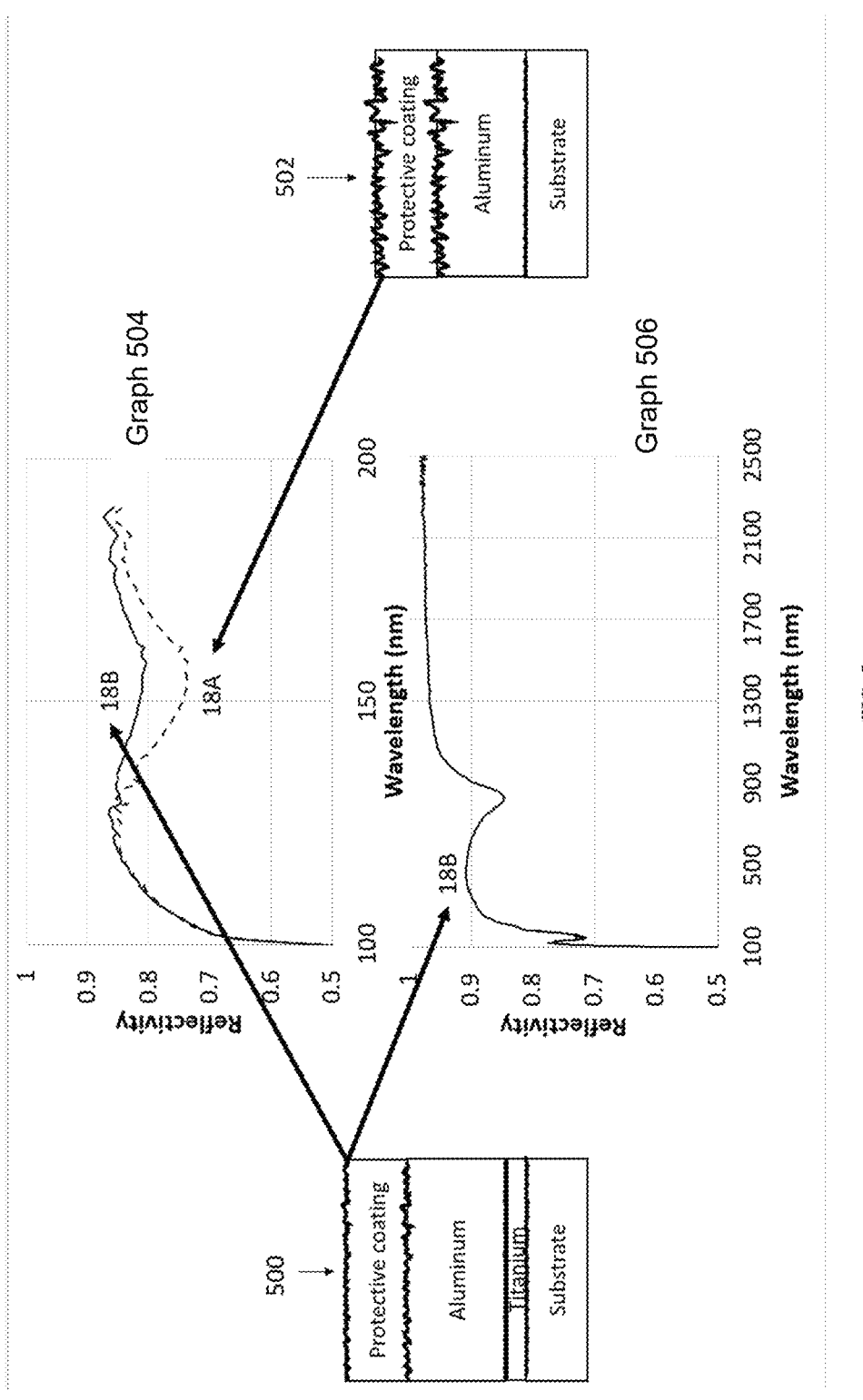
FIG. 5 is a schematic illustration of embodiments of the present disclosure and data related thereto.
Figures 12A, 12B:
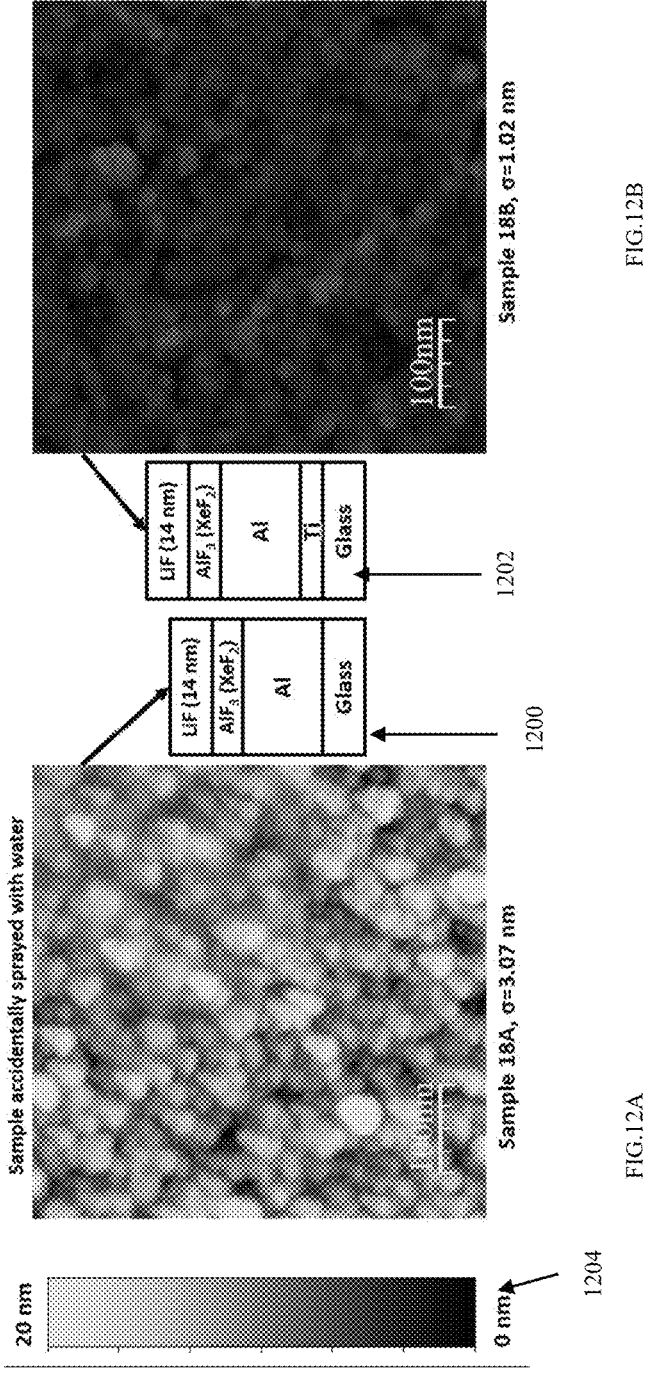
FIGS. 12A and 12B are the results of the Atomic Force Microscopic (AFM) characterization of embodiments of the present disclosure.
Figure 13:
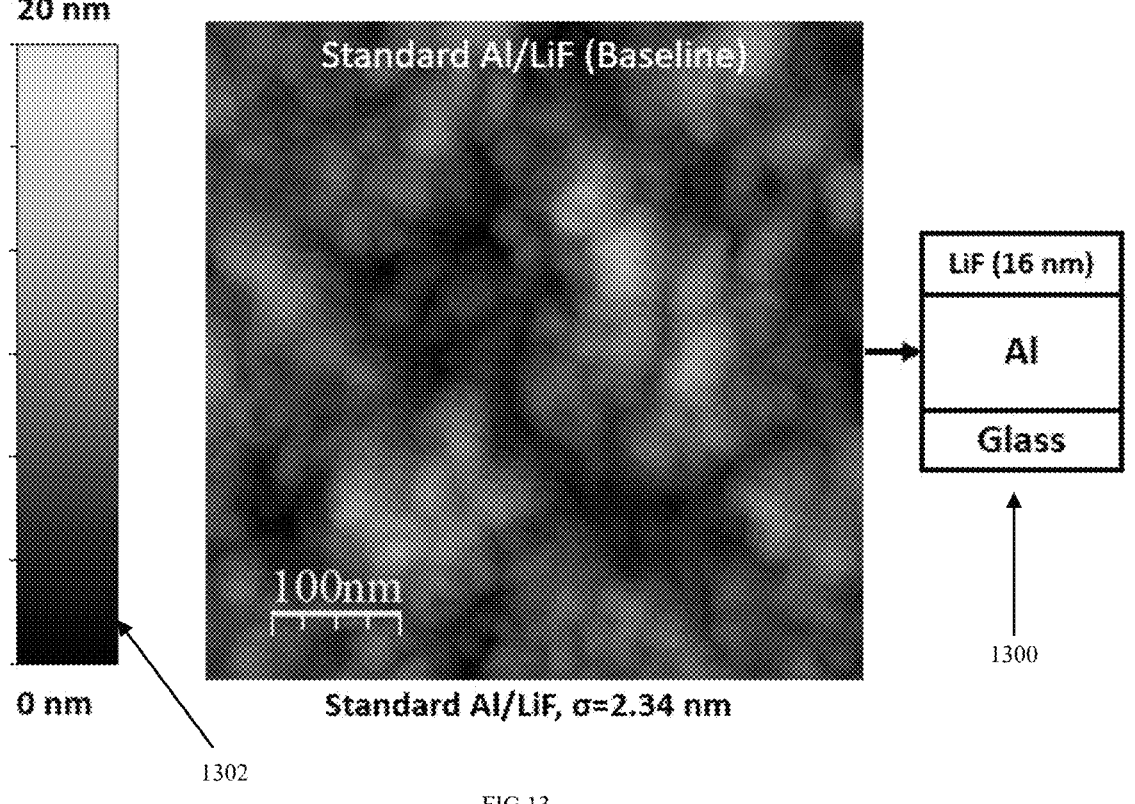
FIG. 13 is the results of the Atomic Force Microscopic (AFM) characterization of an aged Al/LiF mirror (baseline) fabricated with standard PVD.

FIG. 5 illustrates the reflectivity as a function of incident wavelength of multi-layered embodiments with protective dielectric layers. Embodiment 500 (mirror 18B) is a mirror with a glass substrate, a titanium sublayer, an aluminum layer and a protective layer of metal dielectric, and embodiment 502 (mirror 18A), is a mirror with a glass substrate, an aluminum layer and a protective layer of metal dielectric and without a titanium sublayer. Both mirrors 18A and 18B were produced in the same coating run. Mirrors 18A and 18B present excellent FUV average reflectivity of 79.7% and 82.5%, respectively. Graph 506 illustrates the broadband nature of the mirror 18B with the titanium underlayer (embodiment 500), with high reflectivity in the 100 nm to 2500 nm spectral range. Besides, the use of a thin Ti under layer (302 in FIG. 3) under the aluminum layer (304 in FIG. 3), which i) has been demonstrated to reduce the high Al frequency roughness due to modifications in the nucleation dynamics of Al (S. Stempfhuber, N. Felde, S. Schwinde, M. Trost, P. Schenk, S. Schröder, and A. Tunnermann, "Influence of seed layers on optical properties of aluminum in the UV range," Opt. Express 28, 20324-20333 (2020)) and ii) has been reported to increase the reflectivity of Al mirrors for the FUV protected with a metal-fluoride layer ($MgF_2$) (J. I. Larruquert, C. Honrado-Benitez, N. Gutierrez-Luna, A. Rios-Fernandez, and P. Lopez-Reyes, "Far UV-enhanced Al mirrors with a Ti seed film," Opt. Express 29, 7706-7712 (2021)). In order to reduce reflectivity loses due to Al surface plasmon excitation and surface scattering to realize the high reflectivity of Al, the following conditions have to be satisfied: i) the crystallite size of the protective layer should be at least smaller than the minimum operational wavelength, and ii) the mirror surface roughness root mean square (RMS) should be at least smaller than $1/20^{th}$ of the minimum operational wavelength. Graph 504 illustrates the reflectivity differences between the sample with Ti under-layer and the sample without, which are related to mirror roughness. Surface topography of both embodiments 500 and 502 (mirrors 18B and 18A) shown in FIGS. 12A and 12B show that both samples satisfied the aforementioned grain size and roughness conditions for high reflectivity Al mirrors. However, mirror 18B is shown to be smoother and the grains are smaller than in mirror 18A, which translates into higher FUV reflectivity.

Figure 6:
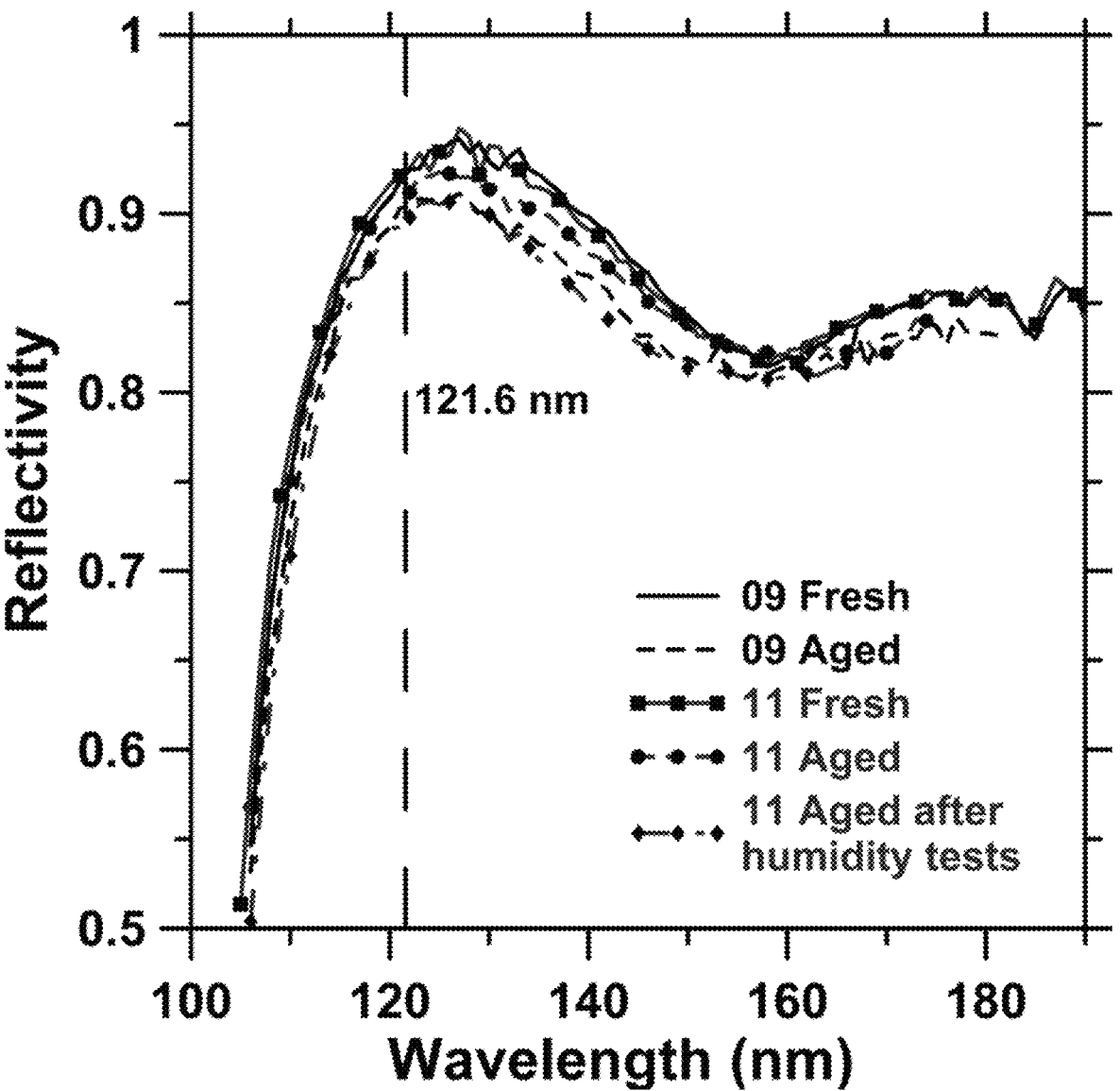
FIG. 6 is a graphic illustration of reflectivity data of embodiments of the present disclosure.

FIG. 6 illustrates reflectivity versus wavelength for two examples of Al/LiF mirrors fabricated with the rPVD described above in which reflectivity of samples 09 and 11 both fresh and aged (18 and 12 weeks, respectively) is shown. The LiF thicknesses of samples 09 and 11 are ≈22.9 nm and are optimized to provide the higher reflectivity at the Hydrogen Lyman a line (121.6 nm), which is one important diagnostic for astronomy and often used as a reference. Among the highest reflectance values reported at 122 nm wavelength, Refs. [M. A. Quijada, S. Rice, and E. Mentzell, "Enhanced $MgF_2$ and LiF Over-coated Al Mirrors for FUV Space Astronomy," Proc. SPIE 8450 (2012); L. V. Rodriguez De Marcos, J. I. Larruquert, J. A. Mendez, N. Gutierrez-Luna, L. Espinosa-Yanez, C. Honrado-Benitez, J. Chavero-Royan, and B. Perea-Abarca, "Optimization of MgF2-deposition temperature for far UV Al mirrors," Opt. Express 26, 9363-9372 (2018); F. Wang, S. Li, Z. Zhang, Z. Wang, H. Zhou, and T. Huo, "Effect of MgF2 deposition temperature on Al mirrors in vacuum ultraviolet," Proc. SPIE 11064, 1106400 (2019); M. A. Quijada, J. G. Del Hoyo, E. Gray, J. G. Richardson, A. Howe, L. Rodriguez de Marcos, D. A. Sheikh, "Influence of evaporation rate and chamber pressure on the FUV reflectance and physical characteristics of aluminum films," Proc. SPIE 11819, 118190G (2021)] demonstrated ≈90%-91% reflectivity with Al/$MgF_2$, Refs. [J. Del Hoyo and M. A. Quijada, "Enhanced aluminum reflecting and solar-blind filter coatings for the far-ultraviolet," Proc. SPIE 10372, 1037204 (2017); N. Gutiérrez-Luna, B. Perea-Abarca, L. Espinosa-Yáñez, C. Honrado-Benítez, T. de Lis, L. Rodríguez-de Marcos, J. A. Aznárez, J. I. Larruquert, "Temperature Dependence of AlF$_3$ Protection on Far-UV Al Mirrors," Coatings 9, 428 (2019); L. V. Rodriguez de Marcos, D. R. Boris, E. Gray, J. G. del Hoyo, A. C. Kozen, J. G. Richardson, S. G. Rosenberg, S. G. Walton, V. Wheeler, E. J. Wollack, J. M. Woodward, and M. A. Quijada, "Room temperature plasma-etching and surface passivation of far-ultraviolet Al mirrors using electron beam generated plasmas," Opt. Mater. Express 11, 740-756 (2021)] demonstrated ≈90%-91% reflectivity with Al/AlF$_3$, and Ref. [M. A. Quijada, Javier del Hoyo, Stephen Rice, "Enhanced Far-Ultraviolet Reflectance of $MgF_2$ and LiF Over-coated Al Mirrors," Proc. SPIE 9144 (2014)] showed ≈90% reflectivity with Al/LiF. Most of these works used high substrate temperatures; exceptions are in Ref. [L. V. Rodriguez de Marcos, D. R. Boris, E. Gray, J. G. del Hoyo, A. C. Kozen, J. G. Richardson, S. G. Rosenberg, S. G. Walton, V. Wheeler, E. J. Wollack, J. M. Woodward, and M. A. Quijada, "Room temperature plasma-etching and surface passivation of far-ultraviolet Al mirrors using electron beam generated plasmas," Opt. Mater. Express 11, 740-756 (2021)] in which room-temperature e-beam generated plasma in SF$_6$/Ar gas mixtures was used to passivate bare Al, and Ref. [M. A. Quijada, J. G. Del Hoyo, E. Gray, J. G. Richardson, A. Howe, L. Rodriguez de Marcos, D. A. Sheikh, "Influence of evaporation rate and chamber pressure on the FUV reflectance and physical characteristics of aluminum films," Proc. SPIE 11819, 118190G (2021)] in which the high reflectance was obtained through optimization of the PVD parameters. With this new method, a reflectivity of 92.6% was obtained at 122 nm wavelength, which is the highest value ever reported at this wavelength.

Figure 7:
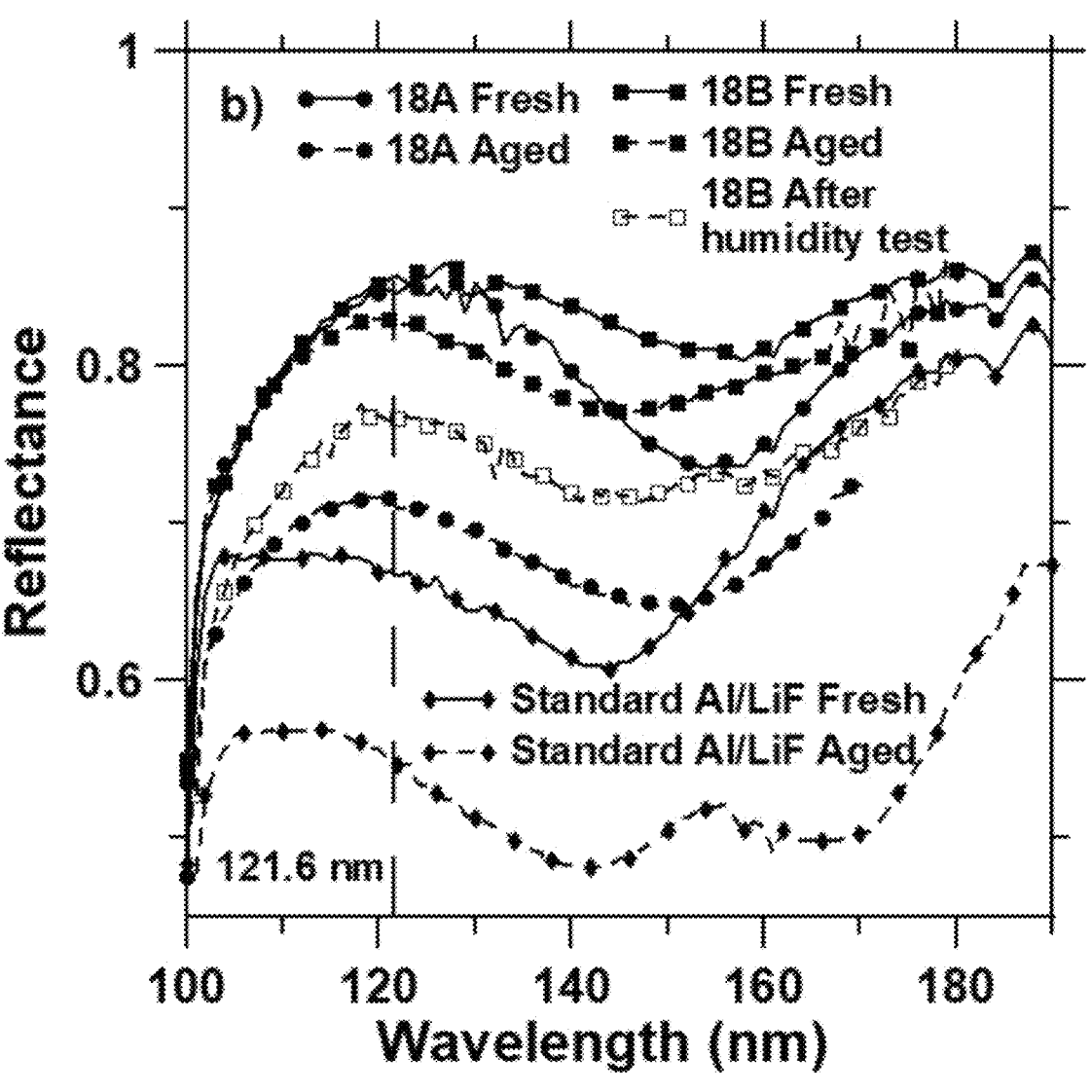
FIG. 7 is a graphic illustration of reflectivity data of embodiments of the present disclosure.

FIG. 7 illustrates reflectivity versus wavelength of as-deposited and aged samples 18A (without Ti seed layer) and 18B (with Ti seed layer located between the substrate and the Al layer), along with a conventional Al/LiF mirror. A noticeable degradation in the aged reflectivity of sample 18A is because the sample was accidentally sprayed with water. The mirrors in FIG. 7 (18A and 18B) were fabricated with a thinner LiF layer (14 nm LiF+2.5 nm AlF$_3$ as a result of Al exposure to XeF$_2$) particularly designed to meet the FUV reflectivity targets for larger-aperture space telescope applications [Matthew R. Bolcar, Kunjithapatham Balasubramanian, Julie Crooke, Lee Feinberg, Manuel Quijada, Bernard J. Rauscher, David Redding, Norman Rioux, Stuart Shaklan, H. Philip Stahl, Carl M. Stahle, Harley Thronson, "Technology gap assessment for a future large-aperture ultraviolet-optical-infrared space telescope," J. of Astronomical Telescopes, Instruments, and Systems 2 (4), 1041209 (2016)] and HabEx [Bertrand Mennesson, Scott Gaudi, Sara Seager, Kerri Cahoy, Shawn Domagal-Goldman, Lee Feinberg, Olivier Guyon, Jeremy Kasdin, Christian Marois, Dimitri Mawet, Tamura Motohide, David Mouillet, Timo Prusti, Andreas Quirrenbach, Tyler Robinson, Leslie Rogers, Paul Scowen, Rachel Somerville, Karl Stapelfeldt, Daniel Sterna, Martin Still, Margaret Turnbull, Jeffrey Booth, Alina Kiessling, Gary Kuan, Keith Warfield, "The habitable exoplanet (habex) imaging mission: preliminary science drivers and technical requirements," J. of Astronomical Telescopes, Instruments, and Systems 9904 (2016)] mission concepts.

An analysis of the effects of the $XeF_2$ and the flash evaporation of LiF in the mirror quality was conducted. The effect of the LiF deposition rate on the reflectivity and surface morphology of Al/LiF mirrors was studied in Ref. (S. Wilbrandt, O. Stenzel, H. Nakamura, D. Wulff-Molder, A. Duparre, and N. Kaiser, "Protected and enhanced aluminum mirrors for the VUV," Appl. Opt. 53, A125-A130 (2014)), and the authors found that mirrors in which LiF was deposited at 2 nm/s were smoother and more efficient in the VUV than these fabricated at 0.2 nm/s. More recently, Quijada et al. demonstrated that the reflectance in the FUV of standard $Al/MgF_2$ mirrors increases linearly with the $MgF_2$ deposition rate. (M. A. Quijada, J. G. Del Hoyo, E. Gray, J. G. Richardson, A. Howe, L. Rodriguez de Marcos, D. A. Sheikh, "Influence of evaporation rate and chamber pressure on the FUV reflectance and physical characteristics of aluminum films," Proc. SPIE 11819, 118190G (2021)). Additionally, it was found that a reflectivity of 90.8% at 122 nm wavelength is achievable using high deposition rates of $MgF_2$. In embodiments of the present disclosure, high Al and LiF deposition rates were used to ensure good quality mirrors. But high LiF deposition rates alone cannot explain the reflectivity values displayed in FIG. 6. Electromagnetic studies of the Al-fluoride interface show that any absorption occurring in the said interface has an important impact on the Al reflectivity. The exposition of Al to $XeF_2$ immediately after the Al deposition grants a thin but highly protective $AlF_3$ layer that prevents Al from reacting with the residual gases, particularly with water vapor.

Moreover, Xie et al. (Z. T. Xie, W. H. Zhang, B. F. Ding, X. D. Gao, Y. T. You, Z. Y. Sun, X. M. Ding, and X. Y. Hou, "Interfacial reactions at Al/LiF and LiF/Al," Appl. Phys. Lett. 94, 063302 (2009)) demonstrated the existence of an Al—F chemical bond in the interface between Al and LiF, both deposited by thermal evaporation, using high-resolution synchrotron radiation photoemission spectroscopy. They found that "during the LiF deposition on the condensed Al film, the chemical bond of LiF is too strong to be broken, but the electron orbits of F would be occupied by electrons of Al or Li in the same degree." Therefore, the exposure of bare Al to $XeF_2$ saturates the Al surface with fluorine, resulting in a thin barrier layer of $AlF_3$ that prevents a possible reaction between Al and Li and F.

Figure 8:
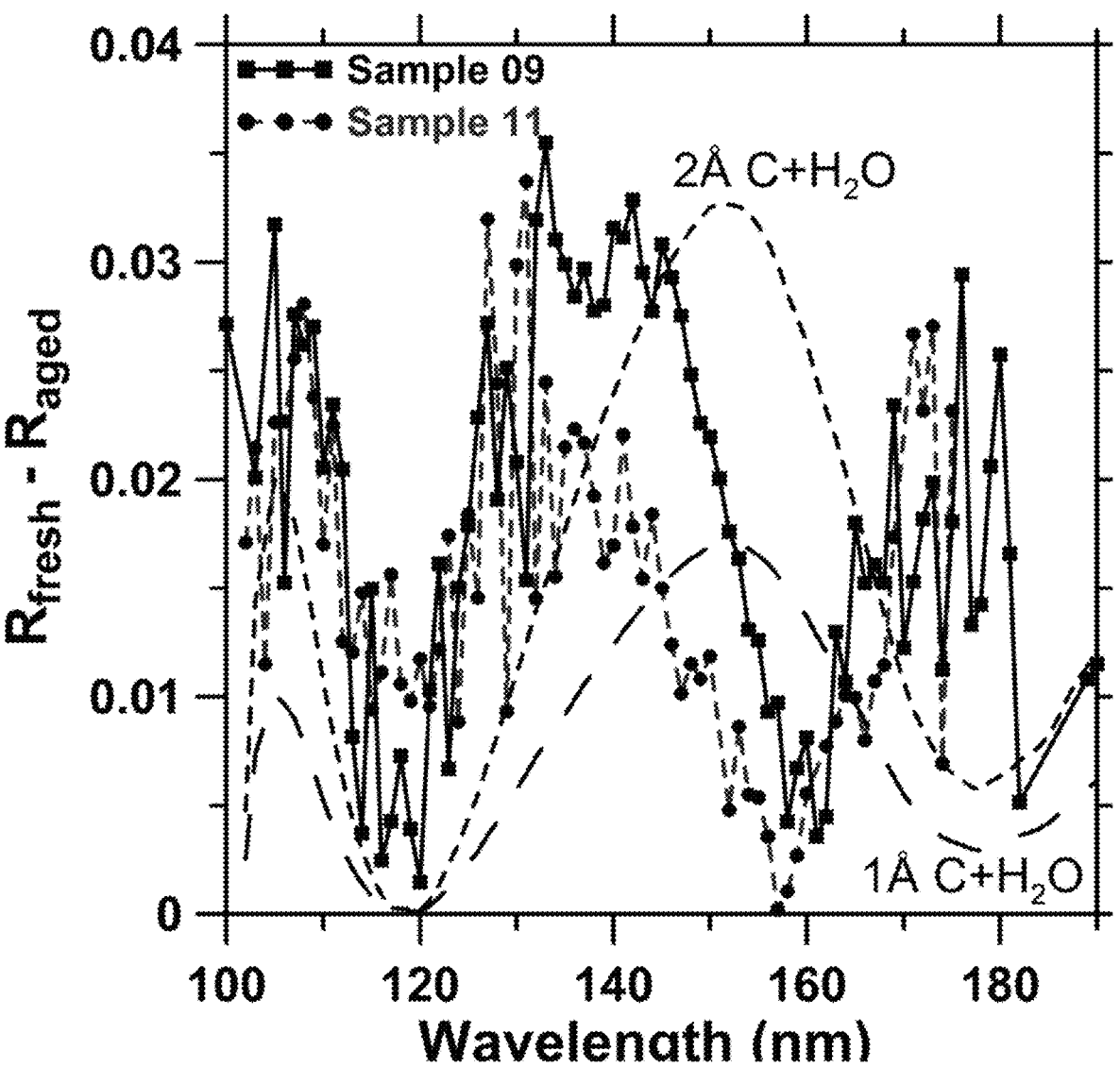
FIG. 8 is a graphic illustration of the reflectivity decay data of embodiments of the present disclosure.

Data showing the stability of the Al/LiF mirrors (samples 09 and 11) is illustrated in FIG. 6. After storage for several months in a desiccator with a relative humidity of 30-35%, the reflectivity of mirrors 09 and 11 at 122 nm wavelength decreased less than 2% (see FIG. 9). The degradation of sample 09 is larger than of sample 11, partly because of the time-lapse between measurements (6 months vs 4 months), and because sample 09 was measured regularly in the first weeks following deposition, so that the sample was exposed several times for a few minutes to the laboratory ambient with 70-75% RH. The degradation of samples 09 and 11 (the latter before the humidity test) can be explained by the formation of a few hydrocarbons and/or water monolayers on the mirror surface. To support this hypothesis, FIG. 8 shows the reflectivity decay ($R_{fresh}-R_{aged}$) as a function of wavelength for samples 09 and 11, and also of a model mirror with a layer of 1 Å for Sample 11 or 2 Å for Sample 09 thickness of carbon and water mixture on top of the mirror. Despite the rough model, it somehow explains the degradation as a function of wavelength. The experimental reflectivity decay has a similar spectral shape as predicted in the model leads us to the intuitive conclusion that most of the decay is due to surface contamination.

Mirrors 18A and 18B also degraded over time (see FIGS. 7 and 10). Mirror 18B presented negligible reflectivity degradation at 103 nm wavelength, and a 3.7% reduction at 122 nm wavelength after 3 months of storage. The aging of mirror 18A could not be tested, as it was accidentally sprayed with a pear-shaped air blower that was used previously to suction tap water out from another apparatus. This caused the surface to be exposed to the tap water. The water was left to dry and this caused water marks to appear on the mirror surface (where water was noted to be present before drying).

Furthermore, samples 11 and 18B underwent an environmental resistance test. Sample 11 was exposed for one week to a constant relative humidity of 50%, and thereafter for two additional weeks at 60% RH. The temperature was kept constant at 25° C. The sample survived with a reflectivity drop of only 2% at 122 nm wavelength without the necessity of using high substrate temperatures during deposition, or of using an $AlF_3$ or $MgF_2$ overcoat. Sample 18B was also exposed to 50% RH and 25° C. for one week. However, an unintended exposure to relative humidity close or to above 100% for 30 minutes happened when sample 18B was being tested due to a failure of the humidity sensor in the environmental chamber. Despite this chamber failure, the sample presented no haziness and experienced a moderate decrease in reflectivity (see FIG. 10). Although the purpose of the test was different, with this accident we demonstrated that the Al/LiF coatings produced through the rPVD process can survive a catastrophic exposure to water vapor during a moderate amount of time. Notably, the reflectivity of the sample after this test is similar (if not better) to that of a freshly deposited conventional Al/LiF, as shown in FIG. 7. The utilization of high deposition LiF rates is expected to increase the packing density of LiF, and denser layers are more stable because have less room for contaminants, particularly water. The use of $XeF_2$ could be playing an important role on the stability of these mirrors because the second in-situ exposure to a high-partial pressure of $XeF_2$ ($\approx 1$ mTorr) of passivated Al mirrors may fill (or even saturate) the pores in the protective layer with fluorine. The latter will eventually be diffused through the protective layer until it reaches the Al. We believe this effect prevents Al from oxidation via oxygen diffusion, as the Al atoms accessible through pores in the protective layer are first filled with fluorine.

Figure 11:
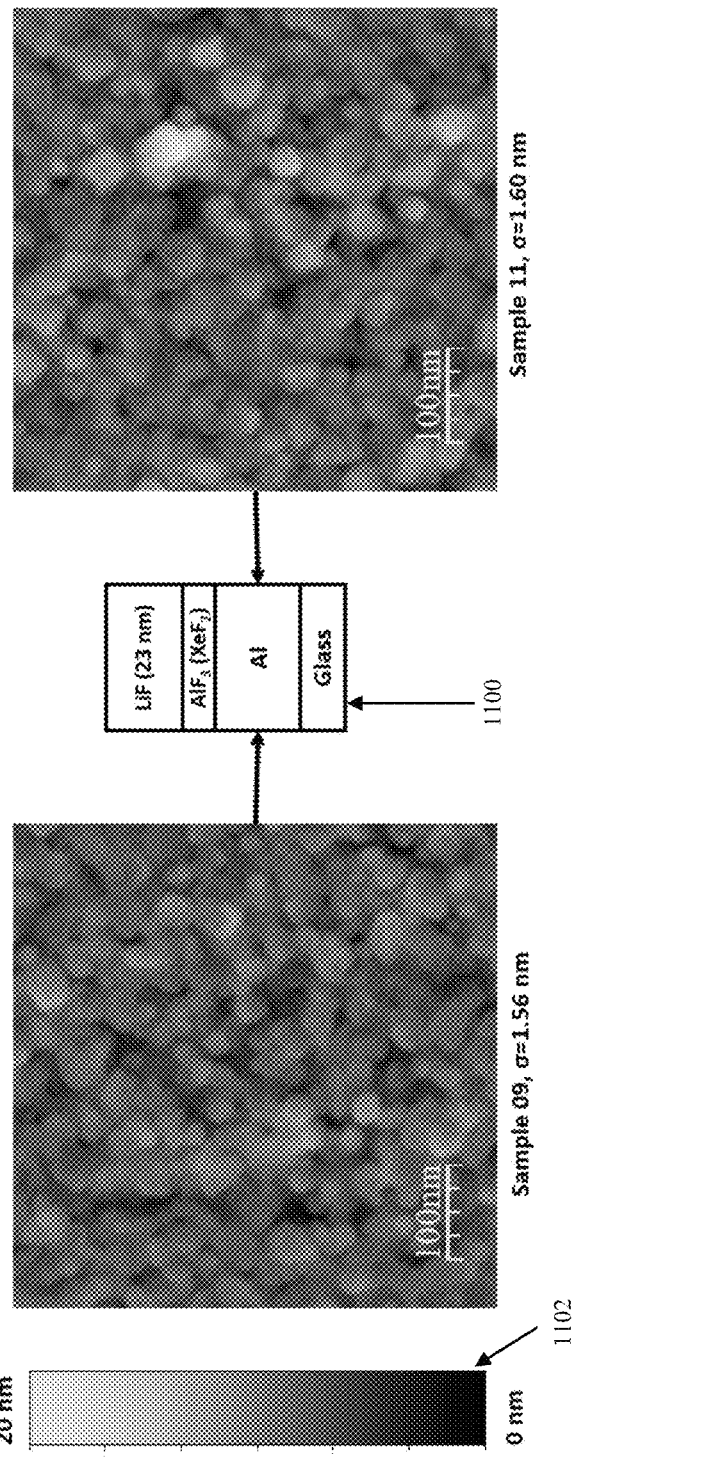
FIG. 11 is the results of the Atomic Force Microscopic (AFM) characterization of embodiments of the present disclosure.

FIGS. 11, 12A, 12B and 13 show the results of the Atomic Force Microscopic (AFM) characterization performed on these samples. Surface topography scans (500 nm×500 nm) of aged samples 09, 11, 18A, and 18B. The AFM topographs of samples 09 and 11 are included in FIG. 11 with the structure thereof 1100 and standard (color bar) 1102. The AFM topographs of samples 18A and 18B are included in FIGS. 12A and 12B with the structures, 1200 and 1202, and standard 12004. The scan of an aged Al/LiF mirror (baseline) fabricated with standard PVD is also included in FIG. 13 as a reference with structure 1300 and standard 1302. The first $XeF_2$ exposure may have smoothing effects. The thin passivation layer resulting from Al immediate exposure to $XeF_2$ after deposition may be responsible for maintaining and/or enhancing the smoothness of the Al surface by perhaps limiting the residual mobility of Al atoms and hence, hindering the growth of Al crystals. All samples deposited with the rPVD process present a surface roughness (RMS) of $\approx 1.6$ nm (samples 09 and 11 in FIG. 11 that both have the structure 1102), and it is further reduced to ≈1 nm when a Ti seed layer is used (sample 18B in FIG. 12B). These values are significantly lower when compared with the ≈2.3 nm roughness of the standard Al/LiF produced with a conventional PVD process using similar Al and LiF evaporation rates. FIGS. 11, 12A and 12B depict examples of AFM topography taken from samples shown in FIGS. 6 and 7. Sample scans were 500 nm×500 nm, but this is just the projected area. As the samples have topography, their real area (ironed surface) is larger. The key factor is that a higher surface roughness means more LiF surface exposed to air, so that samples deposited through the rPVD process may be more stable because are smother and hence, there is less LiF surface exposed to water vapor.

The achieved surface roughness does not appear to have a significant impact on the reflectivity at the short FUV wavelengths (as can be seen in FIG. 7), where samples 18A and 18B, with different surface roughness, have similar R below 115 nm. However, there is a noticeable effect longward of 120 nm related to the excitation of the Al surface plasmon. This topic has been extensively analyzed in Refs. (S. Stempfhuber, N. Felde, S. Schwinde, M. Trost, P. Schenk, S. Schröder, and A. Tunnermann, "Influence of seed layers on optical properties of aluminum in the UV range," Opt. Express 28, 20324-20333 (2020); J. I. Larruquert, C. Honrado-Benitez, N. Gutierrez-Luna, A. Rios-Fernandez, and P. Lopez-Reyes, "Far UV-enhanced Al mirrors with a Ti seed film," Opt. Express 29, 7706-7712 (2021)).

The embodiments of the present disclosure including the rPVD process embodiments of the present disclosure include benefits that were not possible with other coating processes that include protected-Al mirrors with unparallel FUV performance and stability. Embodiments of the present disclosure can be carried out at ambient temperature. The processes of the present disclosure are highly scalable processes, limited only by the sizes of the coating chamber where the passivation (with $XeF_2$) and evaporations of Al and LiF are carried out, therefore the implementation of this process for large area optics is highly feasible.

This written description uses examples as part of the disclosure, including the best model, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While there have been shown, described and pointed out, fundamental features of the present disclosure as applied to the exemplary embodiments thereof, it will be understood that various omissions and substitutions and changes in the form and details of compositions, devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

The invention claimed is:

1. A method of forming a mirror device in a reaction chamber, comprising:
   using a substrate which is positioned in the reaction chamber which is under vacuum;
   using Al that has been evaporated by physical vapor deposition using heated tungsten coils while maintaining the vacuum;
   exposing the substrate to the Al to form an Al layer thereon while maintaining the vacuum;
   exposing the Al layer to $XeF_2$ gas to form a layer of $AlF_3$ on the Al layer while maintaining the vacuum; and
   exposing the $AlF_3$ layer to a metal-fluoride dielectric gas to form a layer of the metal-fluoride dielectric on the $AlF_3$ layer while maintaining the vacuum.

2. The method of claim 1, wherein the substrate is glass.

3. The method of claim 1, wherein the metal-fluoride dielectric is LiF.

4. The method of claim 1, wherein the $XeF_2$ gas is formed by sublimating $XeF_2$ solid under pressure.

5. The method of claim 1, wherein the Al layer is exposed to the $XeF_2$ gas from about 3 to about 30 seconds after formation of the Al layer.

6. The method of claim 1, wherein the rate of the physical vapor deposition of the Al is equal or greater than about 50 Å per second.

7. The method of claim 1, wherein the rate of the deposition of the $XeF_2$ is between about 0.1 Å per second to about 1 Å per second.

8. The method of claim 1, wherein the purity of the metal-fluoride dielectric layer should be greater than about 99.9%.

9. A method of forming a mirror device in a reaction chamber, comprising:
   using a substrate which is positioned in the reaction chamber which is under a vacuum;
   using Al that has been evaporated by physical vapor deposition using heated tungsten coils while maintaining the vacuum;
   exposing the substrate to the Al to form an Al layer thereon while maintaining the vacuum;
   exposing the Al layer to $XeF_2$ gas to form a layer of $AlF_3$ on the Al layer while maintaining the vacuum;
   exposing the $AlF_3$ layer to a metal-fluoride dielectric gas to form a layer of the metal-fluoride dielectric on the $AlF_3$ layer while maintaining the vacuum; and
   exposing the metal-fluoride dielectric layer to $XeF_2$ gas while maintaining the vacuum.

10. The method of claim 9, wherein the substrate is glass.

11. The method of claim 9, wherein the metal-fluoride dielectric is LiF.

12. The method of claim 1, wherein the $XeF_2$ gas is formed by sublimating $XeF_2$ solid under vacuum.

13. The method of claim 9, wherein the Al layer is exposed to the $XeF_2$ gas from about 3 to about 4 seconds after formation of the Al layer.

14. The method of claim 9, wherein the evaporation rate of the Al using physical vapor deposition is equal or greater than about 50 Å per second.

15. The method of claim 9, wherein the purity of the metal-fluoride dielectric layer should be greater than about 99.9%.

\* \* \* \* \*